(12) United States Patent
Hoyne

(10) Patent No.: US 12,450,344 B2
(45) Date of Patent: Oct. 21, 2025

(54) SYSTEMS AND METHODS FOR AUTOMATED INTERVENTION BASED ON A TREND COMPARISON

(71) Applicant: Google LLC, Mountain View, CA (US)

(72) Inventor: Neil Hoyne, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 179 days.

(21) Appl. No.: 17/920,629

(22) PCT Filed: Oct. 12, 2020

(86) PCT No.: PCT/US2020/055234
§ 371 (c)(1),
(2) Date: Oct. 21, 2022

(87) PCT Pub. No.: WO2022/081128
PCT Pub. Date: Apr. 21, 2022

(65) Prior Publication Data
US 2023/0153431 A1    May 18, 2023

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
CPC ... G06F 21/56; G06F 2221/034; G06F 16/288
(Continued)

(56) References Cited

U.S. PATENT DOCUMENTS

| | | | |
|---|---|---|---|
| 9,454,454 B2 | 9/2016 | Abraham et al. | |
| 2004/0153823 A1* | 8/2004 | Ansari | G06F 11/0793 714/38.14 |

(Continued)

FOREIGN PATENT DOCUMENTS

| | | |
|---|---|---|
| CN | 106355432 | 1/2017 |
| CN | 108428153 | 8/2018 |

(Continued)

OTHER PUBLICATIONS

International Search Report for Application No. PCT/US2020/055234, mailed on Jun. 14, 2021, 3 pages.
(Continued)

*Primary Examiner* — Bryan F Wright
(74) *Attorney, Agent, or Firm* — DORITY & MANNING, P.A.

(57) ABSTRACT

A method including accessing, by one or more processors, a data structure associated with an entity, the data structure storing information associated with a set of interactions, calculating, by the one or more processors using one or more models, a contribution associated with the entity based on the information, comparing, by the one or more processors using the one or more models, the information to trends associated with one or more entities sharing a characteristic with the entity, determining, by the one or more processors using the one or more models, whether to trigger an intervening action with respect to the entity based on the comparison of the information to the trends, triggering, by the one or more processors, the intervening action in response to the determination, and recalculating, by the one or more processors using the one or more models, the contribution associated with the entity to determine an effect of the intervening action.

15 Claims, 5 Drawing Sheets

(58) Field of Classification Search
USPC .......................................................... 726/23
See application file for complete search history.

(56) References Cited

U.S. PATENT DOCUMENTS

| | | |
|---|---|---|
| 2015/0142507 A1 | 5/2015 | Osman et al. |
| 2015/0195593 A1 | 7/2015 | Hoyne |
| 2018/0013320 A1* | 1/2018 | Brooks ............... H02J 3/00125 |
| 2018/0025636 A1* | 1/2018 | Boykin ............ G08G 1/096725 |
| | | 701/1 |
| 2018/0308026 A1 | 10/2018 | Sinha et al. |
| 2019/0108240 A1 | 4/2019 | Jalagam et al. |
| 2019/0340684 A1 | 11/2019 | Belanger et al. |

FOREIGN PATENT DOCUMENTS

| | | | | |
|---|---|---|---|---|
| EP | 3096277 A1 | * | 11/2016 | ....... G06F 16/24578 |
| WO | WO2016/187437 | | 11/2016 | |

OTHER PUBLICATIONS

International Preliminary Report on Patentability for Application No. PCT/US2020/055234, mailed Apr. 27, 2023, 8 pages.
Chinese Search Report Corresponding to Application No. 2020801040226 on Aug. 30, 2024.
Chinese Search Report Corresponding to Application No. 2020801040226 on May 29, 2025.

* cited by examiner

SYSTEMS AND METHODS FOR AUTOMATED INTERVENTION BASED ON A TREND COMPARISON

PRIORITY CLAIM

This application is based upon and claims the right of priority under 35 U.S.C. § 371 to International Application No. PCT/US2020/055234 filed on Oct. 12, 2020. Applicant claims priority to and the benefit of each of such applications and incorporates all such applications herein by reference in their entirety.

BACKGROUND

It may be desirable for a content provider to intervene with entities to promote certain outcomes. For example, a streaming service may wish to intervene with a user to increase the user's retention in subsequent months. In various implementations, technical reasons may necessitate intervention. For example, a software bug may affect a portion of edge nodes such as IoT sensors and a targeted intervention may be required to identify and apply a patch to the affected edge nodes. As an additional example, a number of distributed processing clusters in a server may become compromised by stealthy malware and a targeted intervention may be required to identify the affected clusters and reset them. Performing interventions requires identifying entities that may benefit from intervention and/or interventions that may affect the entities. However, identifying entities that may benefit from intervention is difficult. Moreover, content providers may interact with such a large number of entities that it is unrealistic to intervene with all of the entities (or even a large proportion thereof). Furthermore, measuring the effectiveness of intervention may be difficult. Therefore, an improved system for automatically intervening with entities is needed.

SUMMARY

One implementation of the disclosure relates to a method including accessing, by one or more processors, a data structure associated with an entity, the data structure storing information associated with a set of interactions, calculating, by the one or more processors using one or more models, a contribution associated with the entity based on the information, comparing, by the one or more processors using the one or more models, the information to trends associated with one or more entities sharing a characteristic with the entity, determining, by the one or more processors using the one or more models, whether to trigger an intervening action with respect to the entity based on the comparison of the information to the trends, triggering, by the one or more processors, the intervening action in response to the determination, and recalculating, by the one or more processors using the one or more models, the contribution associated with the entity to determine an effect of the intervening action.

In some implementations, determining the effect of the intervening action includes measuring, by the one or more processors, a change in the contribution associated with the entity attributable to the intervening action. In some implementations, the method further includes updating, by the one or more processors, future intervening actions based on the change in the contribution. In some implementations, the intervening action is determined based on the trends. In some implementations, the contribution associated with the entity is a future revenue value. In some implementations, the future revenue value is a customer lifetime value metric. In some implementations, determining whether to trigger the intervening action is further based on a status associated with the entity. In some implementations, the status is based on a retention metric generated by the one or more models using the information. In some implementations, the intervening action includes serving one or more content items to a user.

Another implementation of the disclosure relates to one or more computer-readable storage media having instructions stored thereon that, when executed by one or more processors, cause the one or more processors to access a data structure associated with an entity, the data structure storing information associated with a set of interactions, calculate, using one or more models, a contribution associated with the entity based on the information, compare, using the one or more models, the information to trends associated with one or more entities sharing a characteristic with the entity, determine, using the one or more models, whether to trigger an intervening action with respect to the entity based on the comparison of the information to the trends, trigger the intervening action in response to the determination, and recalculate, using the one or more models, the contribution associated with the entity to determine an effect of the intervening action.

In some implementations, determining the effect of the intervening action includes measuring a change in the contribution associated with the entity attributable to the intervening action. In some implementations, the one or more processors are further configured to update future intervening actions based on the change in the contribution. In some implementations, the intervening action is determined based on the trends. In some implementations, the contribution associated with the entity is a future revenue value. In some implementations, the future revenue value is a customer lifetime value metric. In some implementations, determining whether to trigger the intervening action is further based on a status associated with the entity. In some implementations, the status is based on a retention metric generated by the one or more models using the information. In some implementations, the intervening action includes serving one or more content items to a user.

Another implementation of the disclosure relates to a system for implementing targeted interventions on an entity, the system including one or more processing circuits having one or more processors and one or more memories, each of the one or more memories storing instructions that, when executed by the one or more processors, cause the one or more processors to access a data structure associated with an entity, the data structure storing information associated with a set of interactions, calculate, using one or more models, a future revenue value associated with the entity based on the information, compare, using the one or more models, the information to trends associated with one or more entities sharing a characteristic with the entity, determine, using the one or more models, whether to trigger an intervening action with respect to the entity based on the comparison of the information to the trends, trigger the intervening action in response to the determination, and recalculate, using the one or more models, the future revenue value associated with the entity to determine an effect of the intervening action based on a change in the future revenue value associated with the entity.

In some implementations, the intervening action includes serving one or more content items to a user.

The various aspects and implementations may be combined where appropriate.

DETAILED DESCRIPTION

Following below are more detailed descriptions of various concepts related to, and implementations of, methods, apparatuses, and systems for automatically intervening with entities. The various concepts introduced above and discussed in greater detail below may be implemented in any of numerous ways, as the described concepts are not limited to any particular manner of implementation.

Given scarce resources (e.g., computational, physical, monetary, etc.), it is often desirable to determine an optimal allocation of resources to best achieve a solution. For example, a motion control circuit may have an undesirably high latency and it may therefore be desirable to reduce the latency as much as possible without significant redesign (e.g., using as few resources as possible, etc.). For example, the motion control circuit may be modified by adding an inexpensive capacitor to improve a frequency response of the system. As an additional example, a number of security cameras having different firmware versions may require an update and a targeted intervention to selectively update specific firmware versions may be required.

Determining an optimal allocation of resources may require comparing between several alterative solutions and the corresponding benefit those solutions produce to identify a solution that is most desirable (e.g., provides the greatest benefit for the fewest expended resources, etc.). However, different solutions may involve distinct metrics (e.g., resources, costs, etc.) that are difficult to compare. For example, a first solution may include a predominately temporal cost (e.g., the time associated with adding an inexpensive capacitor to a motion control circuit) while a second solution may include a predominately monetary cost (e.g., the price associated with retooling a manufacturing line to produce a previous design having a more desirable latency). Such metrics (e.g., time and money) may be difficult to compare. Moreover, such challenges are compounded in analysis of non-deterministic systems such as systems involving human operators (e.g., in semi-autonomous manufacturing lines, etc.). For example, it may be difficult to analyze a semi-autonomous manufacturing line to improve production efficiency because the contribution of each individual involved in the manufacturing line is difficult to quantify. Moreover, in some implementations, each contribution may be technical such as a version of a software library that is a dependency for an application. Therefore, there is a need for a system to quantify individual contributions in an environment to facilitate efficient deployment of resources (e.g., computational, physical, monetary, etc.) and determine optimal interventions.

Moreover, it is often desirable to interact with entities (e.g., customers, etc.) to promote a desired outcome. For example, a streaming service may wish to intervene with a user to increase the user's retention in subsequent months. However, identifying entities to intervene with may be difficult. For example, it may be difficult to identify individuals for whom a content intervention may increase a retention rate. Furthermore, it is often unrealistic and inefficient to intervene with every entity. Therefore, a system is needed to facilitate targeted interventions. Targeted interventions may reach specific entities that would most benefit from an intervention and may reduce network overhead as compared to untargeted approaches.

One solution utilizes an entity analysis system to model an individual's contribution to an environment, determine metrics associated with the individual's contribution, and generate interventions based on the metrics. For example, in an analytics environment, the entity analysis system may generate a model of a user's output, determine whether the user's status is likely to change, and generate one or more interventions for the user based on the likelihood of a status change. In some implementations, the entity analysis system may model technical contributions of an entity. For example, the entity analysis system may model the contribution of a developer helping to engineer a mobile application. In various implementations, the entity analysis system analyzes data associated with a user's activity to generate a model that facilitates quantitative comparison of disparate interventions. In some implementations, the model represents user behavior over time. For example, the model may represent a metric associated with the user (e.g., a contribution of the user, etc.) over time. In various implementations, the model may be used to identify appropriate interventions associated with the user. For example, in an analytics environment, the model may be used to identify remunerative users with a high likelihood of an impending status change and generate an intervention to prevent the status change (e.g., serving specific content items, etc.). Additionally or alternatively, the entity analysis system may facilitate manipulation of data structures. For example, the entity analysis system may segregate data in a data structure into a number of groups based on metrics (e.g., quantitative user descriptors, etc.) to facilitate efficient deployment of resources (e.g., targeted interventions, etc.). In some implementations, the entity analysis system may generate one or more models representing a system and/or an environment based on individual user models. For example, the entity analysis system may model a user population to generate macro-trends and/or aggregate statistics associated with the user population. In various implementations, the entity analysis system may use the model of the user population to evaluate changes in characteristics associated with the user population based on various actions and/or interventions and/or to generate suggested interventions. For example, the entity analysis system may facilitate targeted interventions directed towards entities that would most benefit from an intervention, thereby saving computing resources as compared to intervening with every entity. As an additional example, entity analysis system may perform a targeted intervention to selectively send content to a number of kiosks having a particular software version because the software version caused the kiosks to incorrectly display a user interface.

Figure 1:
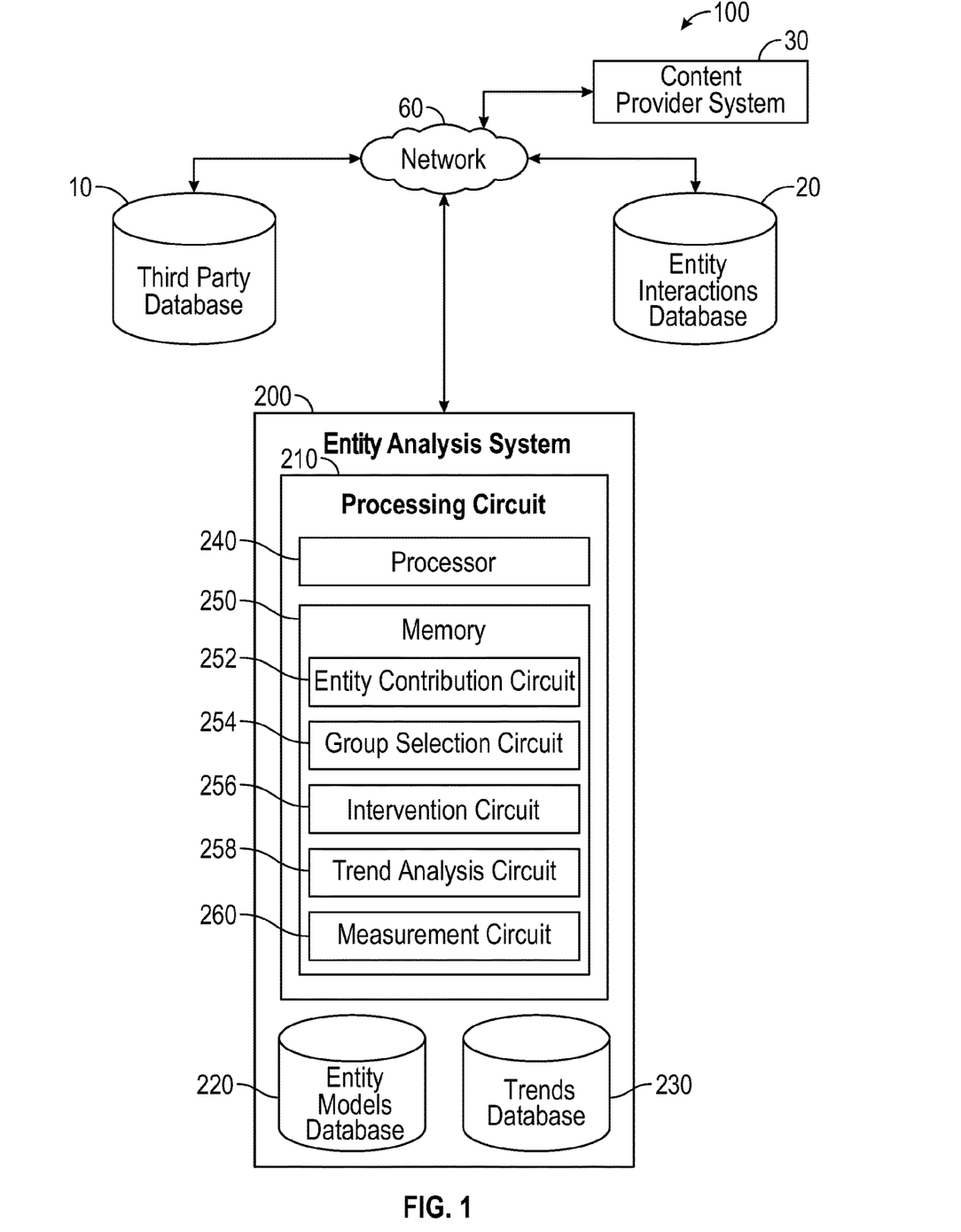
FIG. 1 is a block diagram illustrating a system for performing targeted interventions, according to an illustrative implementation.

Referring now to FIG. 1, system 100 for intervening with entities is shown, according to an illustrative implementation. In various implementations, system 100 may monitor entity interaction data, identify one or more entities in need of intervention, and measure a result of intervention on the one or more entities. In various implementations, system 100 determines one or more interventions for the one or more entities. For example, system 100 may identify one or more content items to serve to an entity. In some implementations, system 100 facilitates improving future interventions based on the measured results of intervention. For example, system 100 may determine that a particular content item was ineffective at altering an entity status and may update a model to make future interventions more effective at altering the entity status.

In various implementations, system 100 reduces computational and/or network overhead associated with typical intervention systems. For example, system 100 may identify specific individuals for whom intervention may be necessary and/or useful and may facilitate targeted intervention for the identified individuals rather than typical drag-net techniques that focus on large user groups. Targeted intervention may reduce network bandwidth consumption associated with typical drag-net techniques. In various implementations, system 100 compares an entity status to macro-trends associated with the entity to determine when intervention is necessary, thereby avoiding overinvestment and/or unnecessary expenditures of network resources. For example, an entity status may indicate that an entity is about to perform an undesirable action (e.g., unsubscribe, etc.), however system 100 may compare the entity status to macro-trends associated with similar entities to determine that a downturn in the economy is driving similar entities to perform the undesirable action and may determine therefore that an intervention is unlikely to prevent the entity from performing the undesirable action, thereby preserving network resources that would otherwise have been spent serving the entity content.

System 100 includes third party database 10, user interactions database 20, content provider system 30, and entity analysis system 200. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Third party database 10 may store third party data. For example, third party database 10 may store transaction information, online interaction information (e.g., search queries, etc.), identifiers (e.g., device identifiers, etc.), descriptive information (e.g., personality identifiers, etc.), timeseries data, historical data (e.g., past interactions, customer-service logs, etc.), and/or the like. In various implementations, third party database 10 is associated with a third party such as a business. In various implementations, the third party data is associated with one or more entities such as individuals, devices, organizations, or the like. For example, the third party data may include performance metrics (e.g., percentage of on-time delivery, quality of work product, price of services, etc.) associated with a service provider such as an accounting firm. In various implementations, the third party data is associated with an entity interaction with a third party. For example, the third party data may include a number of movies that a user watched using an online streaming service.

Entity interactions database 20 may store entity interaction data. For example, entity interactions database 20 may store online interactions (e.g., conversions, impressions, etc.), offline interactions (e.g., purchases, etc.), context information (e.g., reviews, content consumption statistics, etc.), transaction information (e.g., purchased items, prices, quantities, etc.), and/or the like. In various implementations, entity interactions database 20 is associated with a content provider such as an online advertiser. In various implementations, the entity interaction data is associated with one or more entities such as individuals, devices, organizations, or the like. For example, the entity interaction data may include conversion information (e.g., conversion description, price associated, etc.) associated with a device.

Content provider system 30 may serve content to entities. For example, content provider system 30 may be a distributed processing system configured to serve content items such as videos to a website. In various implementations, content provider system 30 is associated with a content provider. For example, content provider system 30 may be associated with an ad serving network. In some implementations, content provider system 30 receives content items from entity analysis system 200 to serve to entities. Additionally or alternatively, content provider system 30 may receive an indication of one or more entities to serve content items to. For example, entity analysis system 200 may send a content item and a group of entities for content provider system 30 to serve the content item to. In various implementations, content provider system 30 measures various attributes associated with content served to entities. For example, content provider system 30 may measure an interaction rate with content. In various implementations, content provider system 30 transmits measurements to entity analysis system 200.

Entity analysis system 200 may analyze information to determine when intervention for an entity is necessary. In various implementations, entity analysis system 200 analyzes entity interaction data to determine whether to intervene with an entity. Additionally or alternatively, entity analysis system 200 may analyze third party data to determine whether to intervene with an entity. Entity analysis system 200 may conserve network resources by identifying specific entities for targeted intervention, thereby preventing network overhead associated with broad untargeted approaches. For example, a typical content item may have dimensions 728×90 and bit depth 24 resulting in a 192 KB content item. Therefore, an untargeted intervention on a population size of 1 million may require transferring over 187 GB of data. However, entity analysis system 200 may facilitate targeted interventions on portions of a population that the intervention may be most likely to succeed with, thereby conserving network resources. Moreover, entity analysis system 200 may facilitate improving intervention efficacy. For example, entity analysis system 200 may train a model using feedback from previous interventions and/or third party (e.g., client, etc.) feedback to improve an effectiveness of future interventions.

In some implementations, entity analysis system 200 is a distributed system (e.g., cloud processing system, etc.). For example, entity analysis system 200 may be a server, distributed processing cluster, cloud processing system, or any other computing device. Entity analysis system 200 may include or execute at least one computer program or at least one script. In some implementations, entity analysis system 200 includes combinations of software and hardware, such as one or more processors configured to execute one or more scripts stored on one or more memories.

Entity analysis system 200 is shown to include processing circuit 210, entity models database 220, and trends database 230. Processing circuit 210 may include processor 240 and memory 250. Memory 250 may have instructions stored thereon that, when executed by processor 240, cause processing circuit 210 to perform the various operations described herein. The operations described herein may be implemented using software, hardware, or a combination thereof. Processor 240 may include a microprocessor, ASIC, FPGA, etc., or combinations thereof. In many implementations, processor 240 may be a multi-core processor or an array of processors. Memory 250 may include, but is not limited to, electronic, optical, magnetic, or any other storage devices capable of providing processor 240 with program instructions. Memory 240 may include a floppy disk, CD-ROM, DVD, magnetic disk, memory chip, ROM, RAM, EEPROM, EPROM, flash memory, optical media, or any other suitable memory from which processor 240 can read instructions. The instructions may include code from any suitable computer programming language such as, but not limited to, C, C++, C#, Java, JavaScript, Perl, HTML, XML, Python and Visual Basic.

Memory 250 may include entity contribution circuit 252, group selection circuit 254, intervention circuit 256, trend analysis circuit 258, and measurement circuit 260. Entity contribution circuit 252 may calculate a contribution metric associated with an entity. For example, entity contribution circuit 252 may calculate a customer lifetime value (CLV) associated with an entity. As an additional example, entity contribution circuit 252 may calculate a metric describing the contribution an entity made to an outcome, such as a number of lines of code a developer wrote as part of a mobile application. In various implementations, entity contribution circuit 252 executes one or more models to generate information about an entity. For example, entity contribution circuit 252 may execute a first model to generate a metric associated with how frequently an entity interacts and may execute a second model to generate a metric associated with how likely an entity is to churn during a given period. Churn may describe a rate at which a first entity stops interacting with a second entity. In some implementations, entity contribution circuit 252 implements a Buy Till You Die (BTYD) model to forecast CLV. For example, entity contribution circuit 252 may implement a Pareto/NBD model. In various implementations, entity contribution circuit 252 uses entity interaction data and/or third party data to calculate CLV. For example, entity contribution circuit 252 may execute a model using recency and frequency data associated with an entity. In some implementations, entity contribution circuit 252 implements one or more functions to calculate an entity contribution. For example, entity contribution circuit 252 may implement the function:

$$CLV_j = \frac{\bar{s}_j}{\bar{c}_j}$$

where j is a cohort ranging from j=1, ..., N, N is the number of cohorts, $\bar{c}_j$ is the average churn rate associated with cohort j, and $\bar{s}_j$ is the average spend rate associated with cohort j calculated based on the formula:

$$\bar{s}_j = \frac{\sum_{i \in G_j} s_i}{|G_j| \sum_{i \in G_j} a_i}$$

where $G_j$ is the set of entities assigned to cohort j, $s_i$ is how much entity i spent over the course of their lifetime, and $a_i$ is an age of the entity i. In various implementations, entity contribution circuit 252 generates a metric describing an entity retention (e.g., a retention probability, a cost of retention, etc.). In various implementations, entity contribution circuit 252 generates results associated with a time period. For example, entity contribution circuit 252 may generate a metric that forecasts the next six months of an entities activity. In various implementations, entity contribution circuit 252 may generate an entity status associated with an entity. For example, entity contribution circuit 252 may execute a model to determine whether a user is an "active customer," an "inactive customer" (e.g., dead, etc.), and/or the like. In some implementations, entity contribution circuit 252 identifies if the entity is likely to change status. For example, entity contribution circuit 252 may analyze historical interaction data associated with an entity to determine whether the entity is likely to stop interacting with a third party in the near future.

Group selection circuit 254 may segment one or more populations into groups. For example, group selection circuit 254 may segregate engineering divisions of a company into groups based on which divisions contributed to an outcome (e.g., a product, etc.). In various implementations, group selection circuit 254 segments populations based on characteristics. For example, group selection circuit 254 may segregate a user population into groups based on a commercial industry associated with each user. As an additional example, group selection circuit 254 may segregate a number of devices based on which devices may benefit from an intervention. In various implementations, group selection circuit 254 utilizes entity interaction data and/or third party data. Additionally or alternatively, group selection circuit 254 may use an entity contribution associated with each entity to determine groups. For example, group selection circuit 254 may identify a number of users having an entity contribution metric that indicates that they may benefit from an intervention (e.g., to promote a particular outcome, etc.). In some implementations, group selection circuit 254 utilizes one or more user defined parameters. For example, group selection circuit 254 may receive a sensitivity metric from a user and use the sensitivity metric to determine which entities are segmented into particular groups. In some implementations, intervention circuit 256 performs interventions on one or more groups generated by group selection circuit 254. In some implementations, group selection circuit 254 segregates entities based on an entity status. For example, group selection circuit 254 may segregate a population of entities into a first group having a first status indicating that the entity would benefit from an intervention and a second group having a second status indicating that the entity would not benefit from an intervention.

Intervention circuit 256 may determine one or more interventions to perform on one or more entities. For example, intervention circuit 256 may generate a recommendation for a content item to serve to one or more entities. In various implementations, intervention circuit 256 generates recommended interventions. For example, intervention circuit 256 may send a recommended intervention for use on one or more entities to content provider system 30 for implementation. Additionally or alternatively, intervention circuit 256 may perform one or more interventions. In various implementations, intervention circuit 256 generates interventions tailored to a group of entities. In some implementations, intervention circuit 256 executes one or more models to generate recommended interventions. For example, intervention circuit 256 may execute a model using a CLV of an entity, entity interaction data, and historical data to determine one or more content items to serve to the entity. In some implementations, intervention circuit 256 determines one or more actions to take. For example, intervention circuit 256 may determine based on a watch history of a user that the user may enjoy a new television series and may generate a recommendation to recommend the television series to the user. In some implementations, intervention circuit 256 generates an intervention metric such as an intervention multiplier for one or more entities. For example, intervention circuit 256 may assign an intervention multiplier to an entity that may be used to prioritize content bids associated with the entity (e.g., in order to serve the entity a specific content item, etc.). In various implementations, intervention circuit 256 updates one or more models based on feedback. For example, intervention circuit 256 may update a model used to generate recommended interventions based on the results of a previous intervention (e.g., as measured by measurement circuit 260, etc.). Additionally or alternatively, intervention circuit 256 may update one or more function parameters based on feedback from a third party (e.g., a client, etc.).

Trend analysis circuit 258 may compare metrics associated with one or more entities to trends associated with similar entities. For example, trend analysis circuit 258 may compare a CLV metric associated with an entity to CLV metrics associated with entities in a similar business space as the entity. As another example, trend analysis circuit 258 may compare an entity contribution metric to macro-trends such as a business performance, an economic indicator, and/or the like. In some implementations, trend analysis circuit 258 analyzes retention curves associated with entities such as businesses to determine a baseline metric. For example, trend analysis circuit 258 may determine that, for a population of entities, a retention decrease is common at a certain point in the year. As another example, trends analysis circuit 258 may calibrate an entity metric based on the average variance of entity metrics associated with similar entities. In various implementations, trends analysis circuit 258 triggers one or more interventions associated with an entity. For example, trends analysis circuit 258 may determine that a CLV value associated with an entity is above a threshold and that an entity status of the entity indicates that the entity is likely to stop performing a desired action (e.g., interacting with a third party, etc.), and may trigger an intervention for the entity. In some implementations, the trends are group trends. In some implementations, the trends are technical in nature. For example, the trends may include resource utilization (e.g., memory utilization, etc.), network bandwidth, device latency, and/or the like.

Measurement circuit 260 may measure the effect of intervention with entities. For example, measurement circuit 260 may re-execute one or more models to determine one or more updated metrics associated with an entity after intervention and compare the updated metrics to previous metrics to determine an effect of intervening with an entity. In some implementations, measurement circuit 260 identifies a change in one or more metrics associated with an entity based on an intervention. For example, measurement circuit 260 may compare a retention metric associated with an entity before an intervention and after an intervention to determine a change in retention behavior associated with the entity. In various implementations, measurement circuit 260 interacts with intervention circuit 256 to improve future interventions. For example, measurement circuit 260 may update one or more model parameters used by intervention circuit 256 based on a change in retention behavior associated with a previous intervention to improve future interventions.

Entity models database 220 may store information associated with entities. For example, entity models database 220 may store an entity status and an entity contribution associated with an entity. In various implementations, entity models database 220 stores metrics determined by entity analysis system 200. In some implementations, entity models database 220 stores one or more models associated with entities. For example, entity models database 220 may store a model of entity CLV over time. In various implementations, entity models database 220 stores timeseries data. For example, entity models database 220 may store entity interaction data over time, entity statuses over time, entity contributions over time, and/or the like. In some implementations, entity models database 220 stores technical information. For example, entity models database 220 may store technical specifications (e.g., computing capabilities, bandwidth capabilities, etc.), resource consumption information (e.g., specific chemical reactants required, types of motor oil, a required data format, etc.). In some implementations, entity models database 220 is separate of entity analysis system 200. For example, entity models database 220 may be a standalone database and entity analysis system 200 may query entity models database 220 to information. Entity models database 220 may include one or more storage mediums. The storage mediums may include but are not limited to magnetic storage, optical storage, flash storage, and/or RAM. Entity analysis system 200 may implement or facilitate various APIs to perform database functions (i.e., managing data stored in entity models database 220). The APIs can be but are not limited to SQL, ODBC, JDBC, and/or any other data storage and manipulation API.

Trends database 230 may store information relating to entity trends. For example, trends database 230 may store information describing one or more performance metrics associated with a population. In some implementations, the performance metrics are technical metrics such as a number of computing cycles per second, a number of hashes calculated, and/or a data transfer speed. In various implementations, trends database 230 stores macro-trend information such as economic indicators, productivity statistics, retention curves, and/or the like. In various implementations, trends database 230 stores information that may be used to compare entities to similarly-classified entities. For example, trends database 230 may store CLV metrics associated with a number of entities. In various implementations, trends database 230 stores timeseries data. For example, trends database 230 may store entity statuses associated with a population of entities over a period of time. In some implementations, trends database 230 is separate of entity analysis system 200. For example, trends database 230 may be a standalone database and entity analysis system 200 may query trends database 230 to information. Trends database 230 may include one or more storage mediums. The storage mediums may include but are not limited to magnetic storage, optical storage, flash storage, and/or RAM. Entity analysis system 200 may implement or facilitate various APIs to perform database functions (i.e., managing data stored in trends database 230). The APIs can be but are not limited to SQL, ODBC, JDBC, and/or any other data storage and manipulation API.

Figure 2:
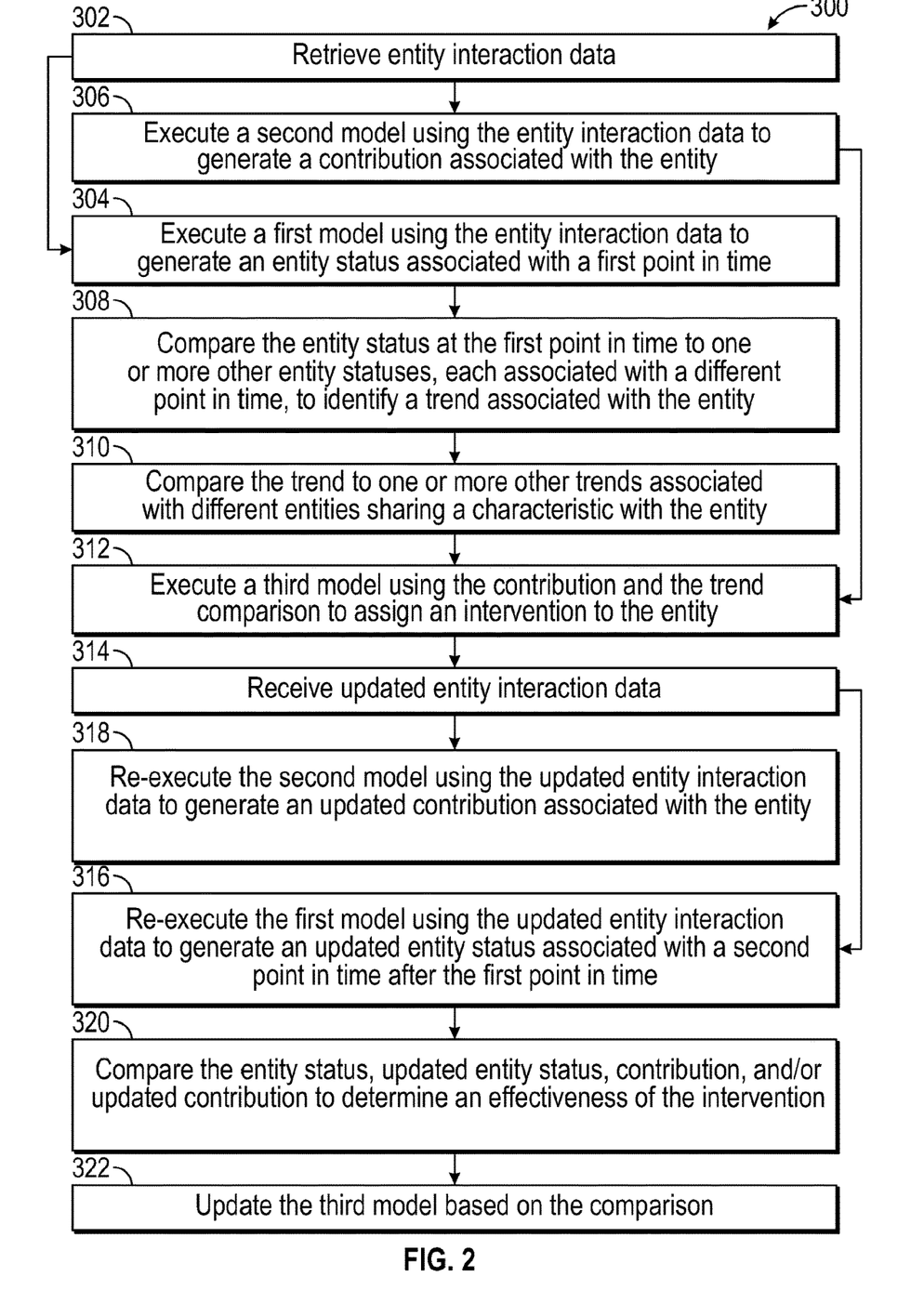
FIG. 2 is a flow diagram illustrating a method of determining an intervention for an entity, according to an illustrative implementation.

Referring now to FIG. 2, method 300 for determining an intervention for an entity is shown, according to an illustrative implementation. In various implementations, entity analysis system 200 performs method 300. For example, entity analysis system 200 may receive entity information from one or more sources and use the entity information to determine whether to trigger an intervention for the entity and measure the effect of the intervention on the entity. In various implementations, method 300 conserves network resources by facilitating targeted interventions and reducing the amount of bandwidth required to promote a desired outcome for an entity population. At step 302, entity analysis system 200 may receive entity interaction data. The entity interaction data may include previous entity interactions, conversions, transactions, and/or the like. For example, the entity interaction data may include information associated with a number of purchases an entity made over a period of time. In some implementations, the entity interaction data is received from entity interactions database 20. Additionally or alternatively, the entity interaction data may be received from third party database and/or content provider system 30. For example, the entity interaction data may include historical search query data associated with an entity.

At step 304, entity analysis system 200 may execute a first model using the entity interaction data to generate an entity status associated with a first point in time. For example, entity analysis system 200 may determine a retention metric associated with a user. In various implementations, entity analysis system 200 executes a model such as a BTYD model to determine the entity status. In various implementations, entity analysis system 200 generates a confidence metric associated with the entity status (e.g., the entity status may be a mean value on a distribution, etc.). Additionally or alternatively, step 304 may include generating a trend associated with the user status. For example, entity analysis system 200 may determine whether a change in the entity's status over time indicates that the entity is likely to interact with a third party in the near future. At step 306, entity analysis system 200 may execute a second model using the entity interaction data to generate a contribution associated with the entity. For example, entity analysis system 200 may generate a future value associated with the entity based on the frequency and recency of the entity's interactions. In some implementations, step 306 includes generating a CLV metric. In various implementations, step 306 includes quantifying one or more parameters. For example, step 306 may include quantifying a user's contribution, such as a number of lines of code written as part of an application development effort, using rules (e.g., a rules engine, etc.).

At step 308, entity analysis system 200 may compare the entity status at the first point in time to one or more other entity statuses, each associated with a different point in time, to identify a trend associated with the entity. For example, entity analysis system 200 may identify a trend of decreasing entity interaction with a third party in an area associated with a recent weather event. In various implementations, step 308 includes comparing the entity status to macro-trends to determine a level of difference between the entity and similar entities. For example, entity analysis system 200 may determine that entities having a particular characteristic experience a decline in their CLV metric at a particular time of year and that such a decline associated with the specific entity is not unusual (e.g., should not trigger an intervention, etc.). At step 310, entity analysis system 200 may compare the trend to one or more other trends associated with different entities sharing a characteristic with the entity. For example, entity analysis system 200 may compare a decreasing CLV metric associated with an entity to CLV metrics associated with similar entities to determine whether the decreasing CLV metric associated with the entity is notable. In various implementations, step 310 includes performing a statistical analysis. For example, entity analysis system 200 may compare a CLV metric associated with an entity to a variance in CLV metrics associated with similar entities. Additionally or alternatively, entity analysis system 200 may compare one or more metrics to a threshold. For example, entity analysis system 200 may determine whether a difference between a CLV metric associated with an entity and an average CLV metric associated with a population of similar entities is below a threshold. In various implementations, entity analysis system 200 compares the trend to one or more other trends associated with a similar point in time.

At step 312, entity analysis system 200 may execute a third model using the contribution and the trend comparison to assign an intervention to the entity. For example, entity analysis system 200 may identify a content item to serve to the entity. Additionally or alternatively, entity analysis system 200 may determine a multiplier to apply to the entity to increase a chance that the entity is served a content item. In some implementations, step 312 may include determining one or more actions for the entity. For example, entity analysis system 200 may determine that the entity should receive free tickets to a sporting event as a promotional offer. In some implementations, step 312 includes performing an intervention. For example, entity analysis system 200 may transmit a multiplier associated with an entity to content provider system 30 to facilitate serving the entity a content item. At step 314, entity analysis system 200 may receive updated entity interaction data. In various implementations, entity analysis system 200 receives updated entity interaction data from content provider system 30. The updated entity interaction data may include entity interactions, conversions, transactions, and/or the like. For example, the updated entity interaction data may include information associated with a number of purchases an entity made over a period of time.

At step 318, entity analysis system 200 may re-execute the second model using the updated entity interaction data to generate an updated contribution associated with the entity. At step 316, entity analysis system 200 may re-execute the first model using the updated entity interaction data to generate an updated entity status associated with a second point in time after the first point in time. At step 320, entity analysis system 200 may compare the entity status, updated entity status, contribution, and/or updated contribution to determine an effectiveness of the intervention. In various implementations, step 320 includes determining a change in one or more metrics. For example, entity analysis system 200 may determine a change in retention behavior associated with an entity based on the comparison. At step 322, entity analysis system 200 may update the third model based on the comparison. For example, entity analysis system 200 may update one or more function weights based on a change in retention behavior determined during step 320. Step 322 may improve future interventions made my entity analysis system 200. For example, entity analysis system 200 may learn over time which interventions are most effective with an entity having particular characteristics. In some implementations, step 322 includes updating the third model based on feedback. For example, a third party may provide feedback and entity analysis system 200 may update the third model based on the third party feedback.

Figure 3:
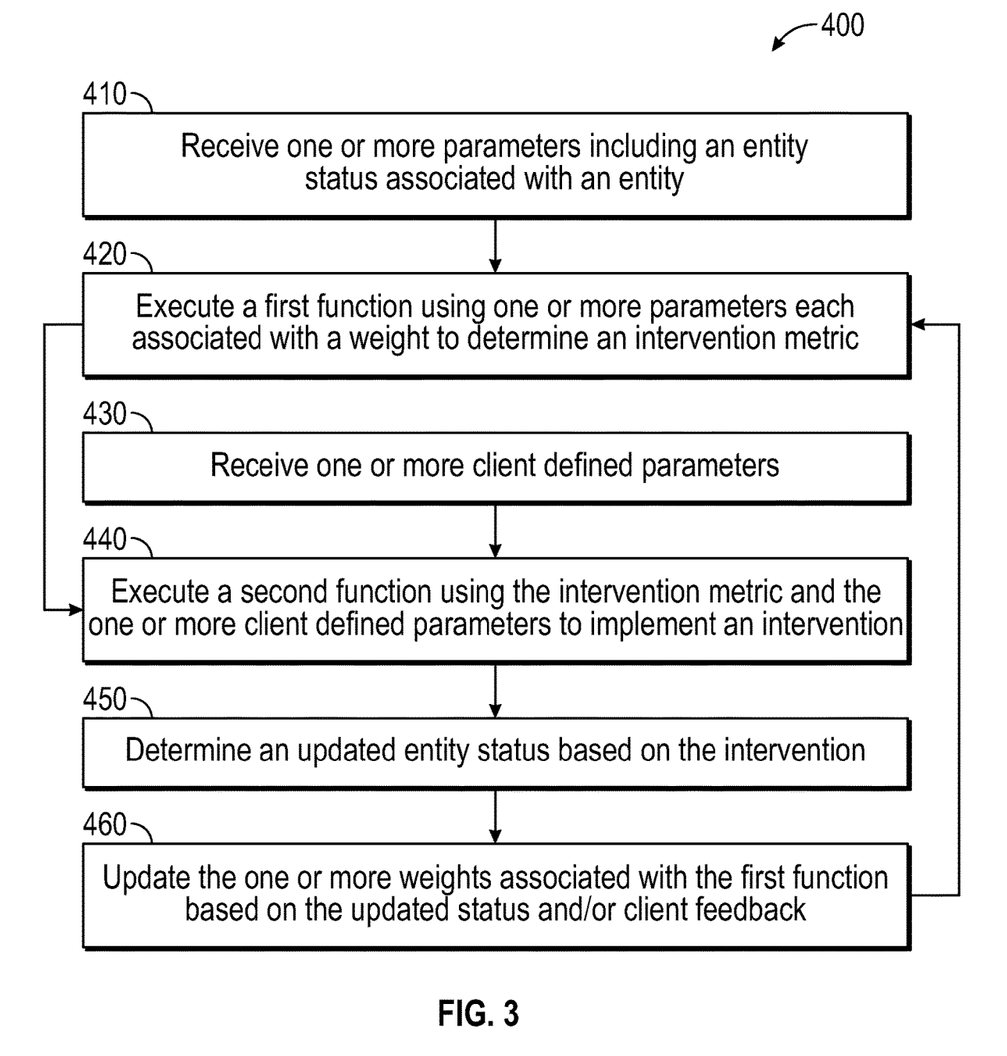
FIG. 3 is a flow diagram illustrating a method of updating a model to improve entity targeting and intervention effectiveness, according to an implementation.

Referring now to FIG. 3, method 400 for updating a model to improve entity targeting and intervention effectiveness is shown, according to an illustrative implementation. In various implementations, entity analysis system 200 performs method 400. For example, entity analysis system 200 may perform method 400 as part of every intervention. At step 410, entity analysis system 200 may receive one or more parameters including an entity status associated with an entity. For example, entity analysis system 200 may receive a CLV metric and status associated with the entity. At step 420, entity analysis system 200 may execute a first function using one or more parameters each associated with a weight to determine an intervention metric. In some implementations, the one or more parameters include the one or more parameters received in step 410. In various implementations, the one or more parameters include a contribution associated with an entity, the result of a trend comparison between the entity and similar entities, and/or an extra metric for capturing other variables. In some implementations, the extra metric is used to calibrate the first function. In various implementations, the intervention metric includes a multiplier. For example, the multiplier may be used to increase a likelihood that an entity is served a content item (e.g., in a competitive content bidding system, etc.). At step 430, entity analysis system 200 may receive one or more client defined parameters. For example, the client defined parameters may include a maximum intervention cost, a reach metric (e.g., a number of entities, etc.), and/or the like. In various implementations, the client defined parameters are received from a third party.

At step 440, entity analysis system 200 may execute a second function using the intervention metric and the one or more client defined parameters to implement an intervention. In various implementations, step 440 includes serving one or more entities one or more content items. For example, entity analysis system 200 may send an intervention multiplier, a maximum intervention cost, and a reach metric to content provider system 30 and content provider system 30 may serve content to the entity based on the received information. In some implementations, step 440 includes generating a multiplier. At step 450, entity analysis system 200 may determine an updated entity status based on the intervention. For example, entity analysis system 200 may determine an entity status as described above. At step 460, entity analysis system 200 may update the one or more weights associated with the first function based on the updated status and/or client feedback. In some implementations, step 460 includes updating a machine learning algorithm such as updating the weights associated with nodes of a neural network. In some implementations, entity analysis system 200 updates the weights to improve future intervention determinations. For example, entity analysis system 200 may update weights associated with a reach metric and/or a maximum intervention cost to increase a sensitivity of future interventions.

Figure 4:
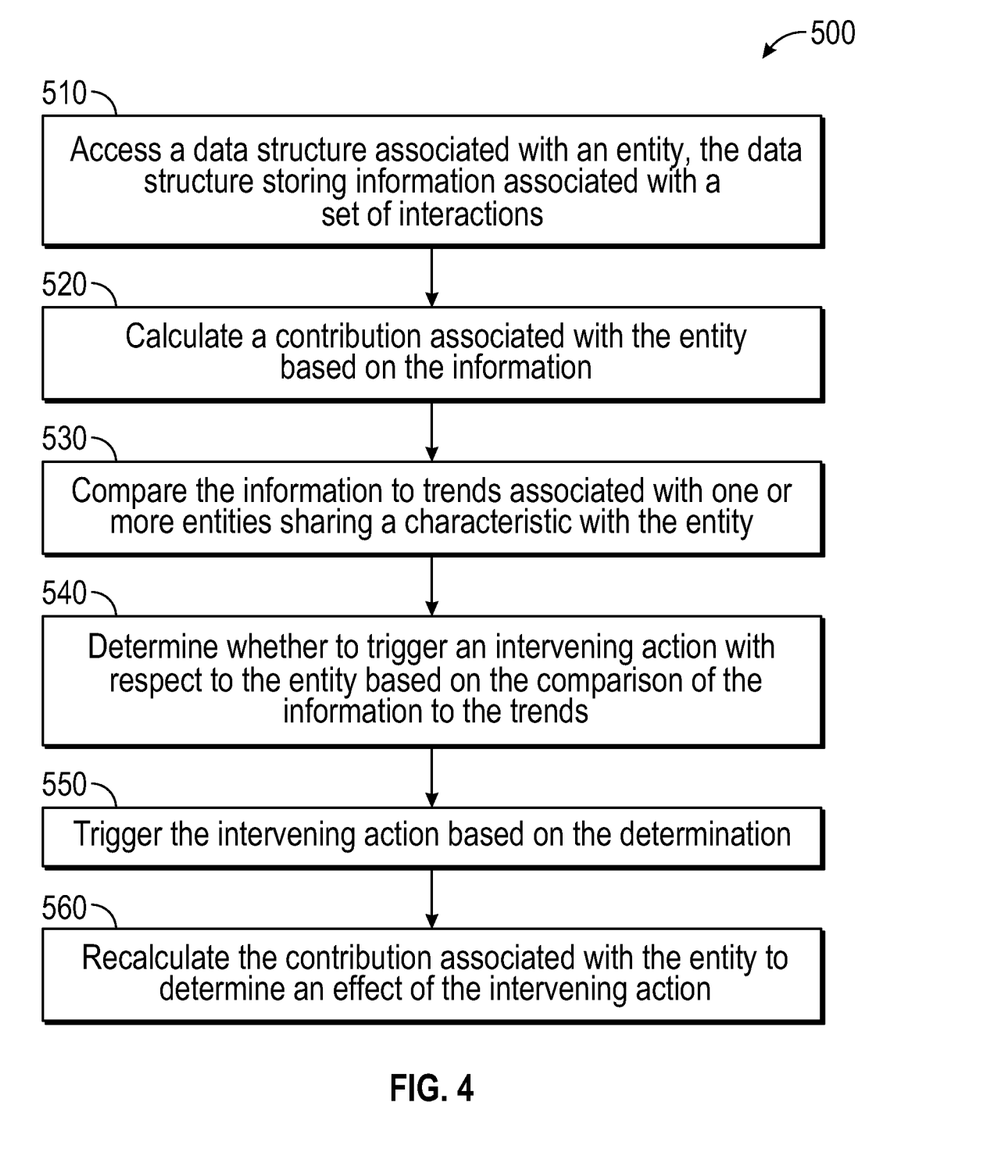
FIG. 4 is a flow diagram illustrating a method of targeted intervention, according to an illustrative implementation.

Referring now to FIG. 4, method 500 is shown for targeted intervention, according to an illustrative implementation. In various implementations, entity analysis system 200 performs method 500. In various implementations, method 500 includes executing one or more models. At step 510, entity analysis system 200 may access a data structure associated with an entity, the data structure storing information associated with a set of interactions. For example, the data structure may store conversion information, impression information, entity actions, entity preferences, and/or the like. In some implementations, the data structure stores technical information such as a number of computing cycles per second, memory addresses associated with particular variables, register update bits, and/or the like. At step 520, entity analysis system 200 may calculate a contribution associated with the entity based on the information. In some implementations, the contribution is a marginal contribution. For example, the contribution may equal the value of a group including an entity minus the value of the group without the entity and/or minus the value created by the entity alone. In various implementations, step 520 includes determining a CLV metric associated with an entity. For example, entity analysis system 200 may determine a future value of an entity based on previous interactions associated with the entity (e.g., a future revenue value associated with the entity). In some implementations, step 520 is performed using one or more models. For example, step 520 may include executing a BTYD model. In some implementations, the contribution is a technical contribution such as the contribution of a processing cluster in calculating a cryptographic hash for a blockchain block as part of a distributed processing system. At step 530, entity analysis system 200 may compare the information to trends associated with one or more entities sharing a characteristic with the entity. For example, entity analysis system 200 may compare a recency and frequency of user interaction to similar information associated with a population of users having the same preferences as the user. In various implementations, step 530 includes comparing the contribution determined in step 520 to a contribution associated with a number of similar entities. In some implementations, technical trends are compared such as comparing a contribution of a processing cluster in calculating a cryptographic hash to trends of similar clusters computing hashes over time. At step 540, entity analysis system 200 may determine whether to trigger an intervening action with respect to the entity based on the comparison of the information to the trends. In some implementations, step 540 includes comparing one or more metrics included in the information to one or more thresholds. For example, step 540 may include comparing an entity status to a threshold to determine whether the entity status is likely to change in the near future. As another example, step 540 may include comparing a metric to a binary value (e.g., a value taking one of two forms, etc.) to determine whether to trigger an intervening action (e.g., an intervention, etc.). As yet another example, step 540 may include comparing the heat generated by a processing cluster running a specific software version to heat trends for processing clusters having a different software version to determine whether to intervene (e.g., push a software patch to the processing cluster, etc.). In some implementations, step 540 includes executing one or more models. For example, step 540 may include executing a content serving model using a multiplier applied to an entity and one or more client defined parameters.

At step 550, entity analysis system 200 may trigger the intervening action based on the determination. For example, entity analysis system 200 may determine that an entity status is likely to change and that the entity has a positive CLV and may therefore implement an intervening action with the entity to promote a desired outcome (e.g., an interaction, etc.). In some implementations, entity analysis system 200 performs the intervening action. Additionally or alternatively, entity analysis system 200 may cause another system (e.g., content provider system 30, etc.) to perform the intervening action. In some implementations, the intervention is a technical intervention such as performing a targeted software update. At step 560, entity analysis system 200 may recalculate the contribution associated with the entity to determine an effect of the intervening action. In some implementations, step 560 includes comparing the recalculated contribution to a previous contribution to determine a change. In some implementations, step 560 includes recalculating an entity status associated with the entity. For example, entity analysis system 200 may recalculate an entity status and compare the updated entity status to a previous entity status to determine a change in retention behavior. As an additional example, entity analysis system 200 may measure the heat generated by a processing cluster and recompare the value to heat trends of similar processing clusters. In some implementations, step 560 includes transmitting the effect of the intervening action to one or more parties (e.g., a third party, etc.). In some implementations, step 560 includes executing one or more models (e.g., a BTYD model, etc.). In various implementations, method 500 reduces computational and/or network overhead associated with typical intervention systems. For example, method 500 may identify specific edge nodes having legacy drivers that may be vulnerable to exploitation and may facilitate targeted intervention for the identified edge nodes (e.g., push a driver update, etc.) rather than attempting to push an update to every edge node which could involve substantial downtime, etc.

Figure 5:
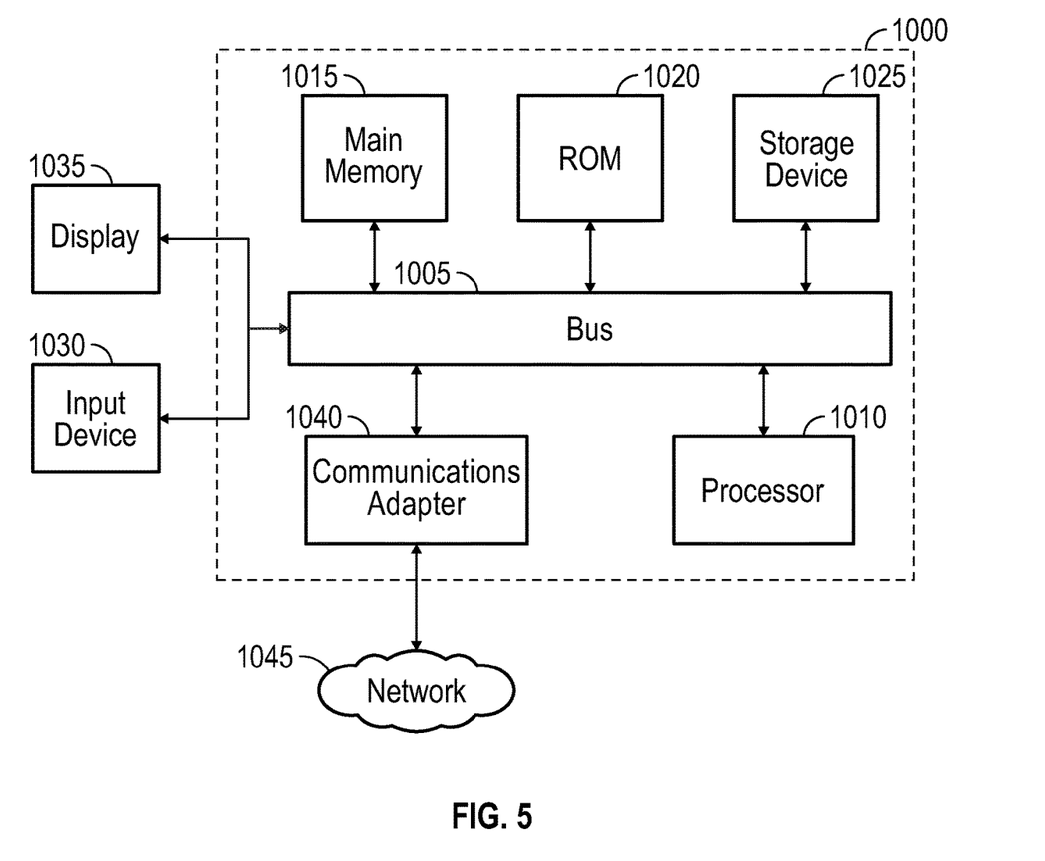
FIG. 5 is a block diagram of a computing system, according to an illustrative implementation.

FIG. 5 illustrates a depiction of a computing system 1000 that can be used, for example, to implement any of the illustrative systems (e.g., entity analysis system 200, etc.) described in the present disclosure. The computing system 1000 includes a bus 1005 or other communication component for communicating information and a processor 1010 coupled to the bus 1005 for processing information. The computing system 1000 also includes main memory 1015, such as a random access memory ("RAM") or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory ("ROM") 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). The computer storage medium may be tangible and/or may be non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    accessing, by one or more processors, a data structure associated with an entity, the data structure storing information associated with a set of interactions;
    calculating, by the one or more processors using one or more models, a contribution associated with the entity based on the information;
    comparing, by the one or more processors using the one or more models, the information to trends associated with one or more entities sharing a characteristic with the entity;
    determining, by the one or more processors using the one or more models, whether to trigger an intervening action with respect to the entity based on the comparison of the information to the trends, wherein the intervening action includes performing a targeted software update;
    triggering, by the one or more processors, the intervening action in response to the determination;
    recalculating, by the one or more processors using the one or more models, the contribution associated with the entity to determine an effect of the intervening action, wherein determining the effect of the intervening action includes measuring a change in the contribution associated with the entity attributable to the intervening action; and
    updating, by the one or more processors, future intervening actions based on the change in the contribution.

2. The method of claim 1, wherein the intervening action is determined based on the trends.

3. The method of claim 1, wherein determining whether to trigger the intervening action is further based on a status associated with the entity.

4. The method of claim 3, wherein the status is based on a retention metric generated by the one or more models using the information.

5. The method of claim 1, wherein the intervening action includes serving one or more content items to a user.

6. One or more non-transitory computer-readable storage media having instructions stored thereon that, when executed by one or more processors, cause the one or more processors to:
    access a data structure associated with an entity, the data structure storing information associated with a set of interactions;
    calculate, using one or more models, a contribution associated with the entity based on the information;
    compare, using the one or more models, the information to trends associated with one or more entities sharing a characteristic with the entity;
    determine, using the one or more models, whether to trigger an intervening action with respect to the entity based on the comparison of the information to the trends, wherein the intervening action includes performing a targeted software update;
    trigger the intervening action in response to the determination;
    recalculate, using the one or more models, the contribution associated with the entity to determine an effect of the intervening action, wherein determining the effect of the intervening action includes measuring a change in the contribution associated with the entity attributable to the intervening action; and
    update future intervening actions based on the change in the contribution.

7. The one or more computer-readable storage media of claim 6, wherein the intervening action is determined based on the trends.

8. The one or more computer-readable storage media of claim 6, wherein determining whether to trigger the intervening action is further based on a status associated with the entity.

9. The one or more computer-readable storage media of claim 8, wherein the status is based on a retention metric generated by the one or more models using the information.

10. The one or more computer-readable storage media of claim 6, wherein the intervening action includes serving one or more content items to a user.

11. A system for implementing targeted interventions on an entity, the system comprising one or more processing circuits having one or more processors and one or more memories, each of the one or more memories storing instructions that, when executed by the one or more processors, cause the one or more processors to:
- access a data structure associated with an entity, the data structure storing information associated with a set of interactions;
- calculate, using one or more models, a contribution associated with the entity based on the information;
- compare, using the one or more models, the information to trends associated with one or more entities sharing a characteristic with the entity;
- determine, using the one or more models, whether to trigger an intervening action with respect to the entity based on the comparison of the information to the trends, wherein the intervening action includes performing a targeted software update;
- trigger the intervening action in response to the determination, wherein the intervening action includes serving one or more content items to a user;
- recalculate, using the one or more models, the contribution associated with the entity to determine an effect of the intervening action based on a change in the contribution associated with the entity, wherein determining the effect of the intervening action includes measuring a change in the contribution associated with the entity attributable to the intervening action; and
- update future intervening actions based on the change in the contribution.

12. The method of claim 1, further comprising:
updating the one or more models based on results of a previous intervention.

13. The method of claim 1, further comprising:
updating a parameter of the one or more models based on feedback from a third party.

14. The method of claim 1, further comprising:
updating a parameter of the one or more models based on a change in retention behavior associated with a previous intervention.

15. The method of claim 1, wherein the intervening action further includes pushing a driver update to an identified edge node.

* * * * *